(12) United States Patent
Younis et al.

(10) Patent No.: US 10,334,129 B2
(45) Date of Patent: Jun. 25, 2019

(54) METHOD OF PRINTING AND SCANNING

(71) Applicant: KYOCERA Document Solutions Inc., Osaka (JP)

(72) Inventors: Ahmad Younis, Walnut Creek, CA (US); Tommy Yue, Daly City, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/954,489

(22) Filed: Apr. 16, 2018

(65) Prior Publication Data

US 2018/0338053 A1 Nov. 22, 2018

Related U.S. Application Data

(63) Continuation of application No. 15/409,424, filed on Jan. 18, 2017, now Pat. No. 9,944,097.

(51) Int. Cl.
| | |
|---|---|
| *G06F 15/00* | (2006.01) |
| *G06F 1/00* | (2006.01) |
| *G06K 1/00* | (2006.01) |
| *G06K 15/00* | (2006.01) |
| *H04N 1/00* | (2006.01) |
| *H04N 1/12* | (2006.01) |
| *G03G 15/23* | (2006.01) |

(52) U.S. Cl.
CPC ....... *H04N 1/00612* (2013.01); *H04N 1/0032* (2013.01); *H04N 1/00575* (2013.01); *H04N 1/00636* (2013.01); *H04N 1/00708* (2013.01); *H04N 1/1215* (2013.01); *G03G 15/23* (2013.01); *H04N 2201/0094* (2013.01); *H04N 2201/3221* (2013.01)

(58) Field of Classification Search
CPC ............. H04N 1/00612; H04N 1/0032; H04N 1/00575; H04N 1/00636; H04N 1/00708; H04N 1/1215; B65H 5/06; B65H 5/36
USPC ...................... 358/1.12, 1.15, 1.13, 1.14, 1.1
See application file for complete search history.

(56) References Cited

U.S. PATENT DOCUMENTS

| | | | |
|---|---|---|---|
| 2018/0103160 A1* | 4/2018 | Sugita | ................ H04N 1/00228 |
| 2018/0198930 A1* | 7/2018 | Tokiwa | .............. H04N 1/00222 |

* cited by examiner

*Primary Examiner* — Douglas Q Tran
(74) *Attorney, Agent, or Firm* — West & Associates, A PC; Stuart J. West

(57) ABSTRACT

A multifunctional printer having a printer section, an auto document feeder, a scanner section, a print path, and a path guide. When the multifunctional printer is not in a print and scan mode, the path guide can move to a position that routes printed paper from the print path to a print output tray. When the multifunctional printer is not in a print and scan mode, the path guide can move to a position that routes printed paper from the print path to the auto document feeder, where it can be scanned.

4 Claims, 14 Drawing Sheets

METHOD OF PRINTING AND SCANNING

CLAIM OF PRIORITY

This application is a continuation of U.S. Non-Provisional application Ser. No. 15/409,424, filed on Jan. 18, 2017, now U.S. Pat. No. 9,944,097 to issue on Apr. 17, 2018, which is incorporated herein by reference.

BACKGROUND

Field of the Invention

The present disclosure relates to multifunctional printers (MFPs), particularly an MFP with a paper path that can convey paper to a scanner following printing.

Background

Multifunctional printers (MFPs) that combine printing, scanning, and copying capabilities are often used in offices and other environments. An MFP can thus provide users with access to different types of functions within a single combined device, which can increase efficiency and save space.

However, the conventional design of an MFP often prohibits performing certain types of its functions sequentially without user interaction. For example, after printing a page most MFPs route the printed page to an output tray either directly or through a finisher. As such, a user who wants to use an MFP to both print pages and then scan the printed pages would need to activate a print function, physically pick up printed pages output by the MFP, move the printed pages to an auto document feeder (ADF) or scanner platen at a different location on the MFP, and then separately activate a scanning function. This can be inconvenient and time-consuming, especially when the user initiates a print job remotely and cannot begin scanning the printed pages or viewing digital scans of the pages until the user walks to the MFP and physically moves the paper to the MFP's scanner.

What is needed is an MFP that can route paper through a paper path such that it can be scanned after it is printed.

SUMMARY

The present disclosure provides a multifunctional printer. The multifunctional printer can comprise a printer section, an auto document feeder, a scanner section, a print path in the printer section, and a path guide at a post-print junction in the print path. The printer section can comprise one or more printer components and a paper storage area. The auto document feeder can comprise a scan output tray. The scanner section can comprise one or more image sensors configured to scan paper passing through the auto document feeder. The print path can branch at the post-print junction into a first path that leads to a print output tray and a second path that leads to the auto document feeder. The path guide can be movable between a first position that diverts paper from the print path into the first path and a second position that diverts paper from the print path into the second path. When the path guide diverts paper in to the second path, the paper can pass into the auto document feeder and be scanned by the image sensors before being output at the scan output tray.

The present disclosure also provides a method of printing and scanning paper at a multifunctional printer. The multifunctional printer can receive a print job print according to the print job by conveying paper from a paper storage area through a print path and printing information on the paper with printer components. The multifunctional printer can determine whether the multifunctional printer is in a print and scan mode. If the multifunctional printer is not in the print and scan mode, the multifunctional printer can move a path guide at a post-print junction to route the paper into a first path that conveys the paper to a print output tray. If the multifunctional printer is in the print and scan mode, the multifunctional printer can move the path guide at the post-print junction to route the paper into a second path that conveys the paper to an auto document feeder. The multifunctional printer can scan the paper with one or more image sensors as the paper is conveyed through the auto document feeder to generate a scanned representation, and can output the paper at a scan output tray The present disclosure also provides a method of printing and scanning paper at a multifunctional printer and transmitting scanned representations to a server. The multifunctional printer can receive a print job and a destination identifier from a local client device, where the destination identifier is associated with a remote client device. The multifunctional printer can print according to the print job by conveying paper from a paper storage area at the multifunctional printer through a print path and printing information on the paper with printer components. The multifunctional printer can route paper from the print path into an auto document feeder connector path that conveys the paper to an auto document feeder. The multifunctional printer can scan the paper with one or more image sensors as the paper is conveyed through the auto document feeder to generate a scanned representation. The multifunctional printer can upload the scanned representation from the multifunctional printer to a server over a network connection along with the destination identifier, such that the server makes the scanned representation available to the remote client device associated with the destination identifier.

DETAILED DESCRIPTION

Figure 1A:
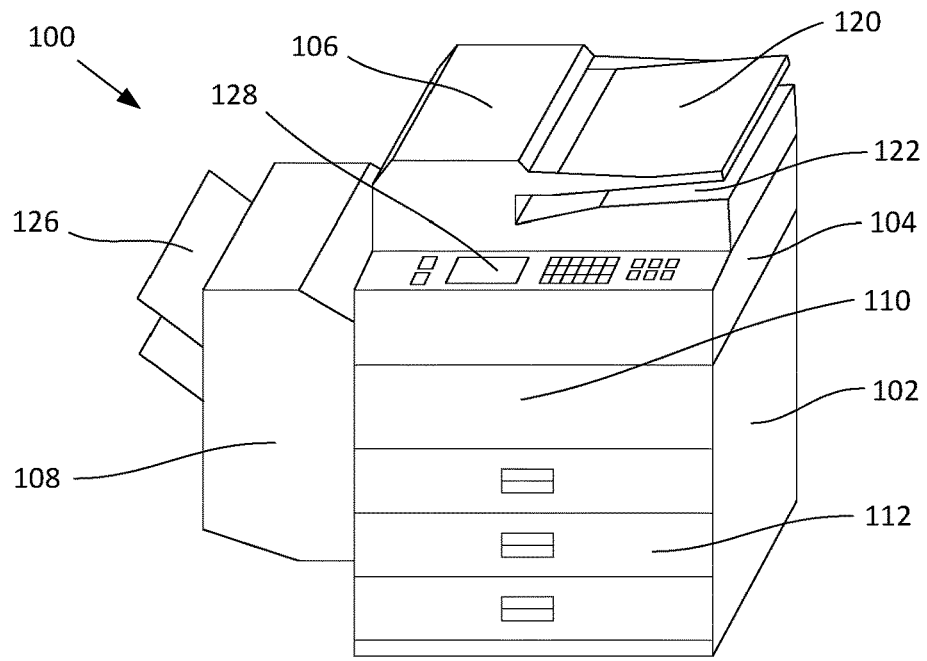
FIG. 1A depicts an exemplary embodiment of a multifunctional printer (MFP) with a closed lid.
Figure 1B:
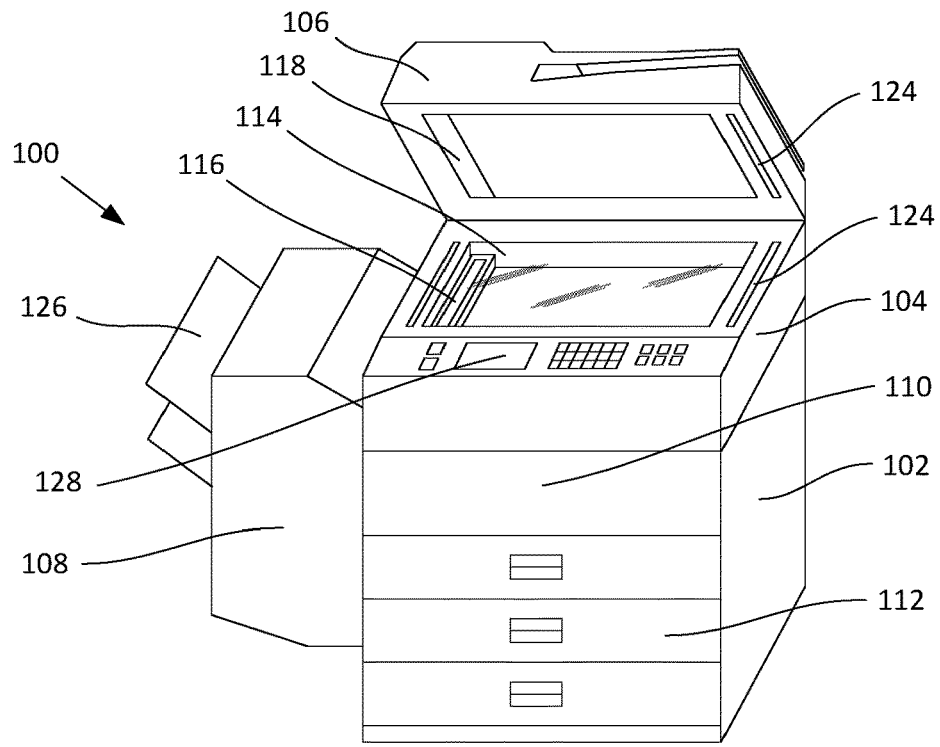
FIG. 1B depicts an exemplary embodiment of an MFP with an open lid.

FIGS. 1A-1B depict an exemplary embodiment of a multifunctional printer (MFP) 100, also known as a "multifunctional product" or "multifunctional system." An MFP 100 can be "all-in-one" machine that has a plurality of different functions such as printing, copying, scanning, faxing, and/or other functions. The MFP 100 can comprise a printer section 102, a scanner section 104, and an auto document feeder (ADF) 106. In some embodiments the MFP 100 can further comprise a finisher 108.

The printer section 102 can comprise printer components 110 configured to print color and/or monochrome text and images on paper that passes through the printer section 102. In some embodiments, the printer section 102 can comprise laser printer components, such as laser diodes, lenses, mirrors, photoconductor drums, toner hoppers, charge rolls, fusers, and/or other components. In other embodiments, the printer section 102 can comprise inkjet printer components, such as print heads and ink cartridges. In still other embodiments, the printer section can comprise components of any other desired type of color or monochrome printer. The MFP 100 can comprise one or more paper storage areas 112, such as drawers or trays, from which it can draw pieces of paper to be printed on by the printer components 110.

The scanner section 104 can comprise a platen 114 and one or more image sensors 116 configured to scan documents placed on the platen 114 or that pass through the ADF 106. The platen 114 can be a transparent planar member, such as a sheet of glass or transparent plastic, through which the image sensors 116 can view documents positioned above the platen 114. The MFP 100 can be configured to store digital representations of scanned documents in memory. In some embodiments the image sensors 116 can be contact image sensors (CIS). In other embodiments the image sensors 116 can be charge coupled devices (CCD) or image sensors of any other type.

The ADF 106 can be mounted on a hinged lid above the scanner section 104 such that the lid can be closed to cover the scanner section's platen 114 as shown in FIG. 1A, or be opened to expose the platen 114 as shown in FIG. 1B. There can also be one or more scanner openings 118 on the bottom surface of the ADF 106, such when the lid is closed and paper is conveyed through the ADF 106, the paper can be scanned by image sensors 116 in the scanner section 104 through the platen 106 as the paper moves past the scanner openings 118 in the ADF 106.

The ADF 106 can comprise a scan input tray 120 configured to accept one or more pieces of paper, such as a stack of paper, that are to be scanned by the scanner section 104. The ADF 106 can also comprise a scan output tray 122 configured to store one or more pieces of paper that are output by the MFP 100 after being scanned and/or printed, as discussed further below.

The lower surface of the ADF 106 and the upper surface of the scanner section 104 can both define paper path cutouts 124. The paper path cutouts 124 can be aligned when the ADF 106 is closed against the scanner section 104 such that paper can pass from the ADF 106 to the scanner section 104, and/or from the scanner section 104 to the ADF 106, via the paper path cutouts 124.

As will be discussed further below, the MFP 100 can have a print and scan mode in which it prints text and/or images on paper using its printer components 110 and then conveys the printed paper through the scanner section 104 into the ADF 106 via the paper path cutouts 124 such that it can be scanned by the scanner section's image sensors 116. After being scanned, the printed paper can then be conveyed through the ADF 106 so that it exits the MFP 100 and rests at the scan output tray 122.

In some embodiments the printer section 102 can notify the scanner section 104 of the size of the paper printed on by its printer components 110, such that the scanner section's image sensors 116 can scan the expected paper size. By way of a non-limiting example, when the printer section 102 pulls 8.5×11 inch paper from a paper storage area 112 and prints on it, the printer section 102 can indicate to the scanner section that it should scan an 8.5×11 inch area as the printed paper is conveyed past its image sensors 116. In alternate embodiments the image sensors 116 can scan paper as it moves past the image sensors 116 to automatically detect the scan size.

In some embodiments the MFP 100 can comprise a removable or permanently connected finisher 108 that can receive paper output by the printer section 102. The finisher 108 can comprise a print output tray 126 configured to store one or more pieces of paper until the paper is removed by a user, a stapler configured to staple stacks of paper that are within the finisher 108 or that are resting at the print output tray 126, and/or one or more other components configured to perform selected actions on paper, such as hole punching, folding, and/or collating.

The MFP 100 can additionally comprise input/output devices 128. The input/output devices 128 can be screens, buttons, keyboards, switches, dials, indicator lights, speakers, and/or any other type of input or output device. By way of a non-limiting example, an input/output device 128 can be a liquid-crystal display (LCD) screen mounted on the exterior of the MFP 100, such as at a position adjacent to the platen 114. In some embodiments, screens can be touch-sensitive. In other embodiments, users can interact with a user interface displayed on a screen using other controls such as buttons or keyboards.

Figure 2:
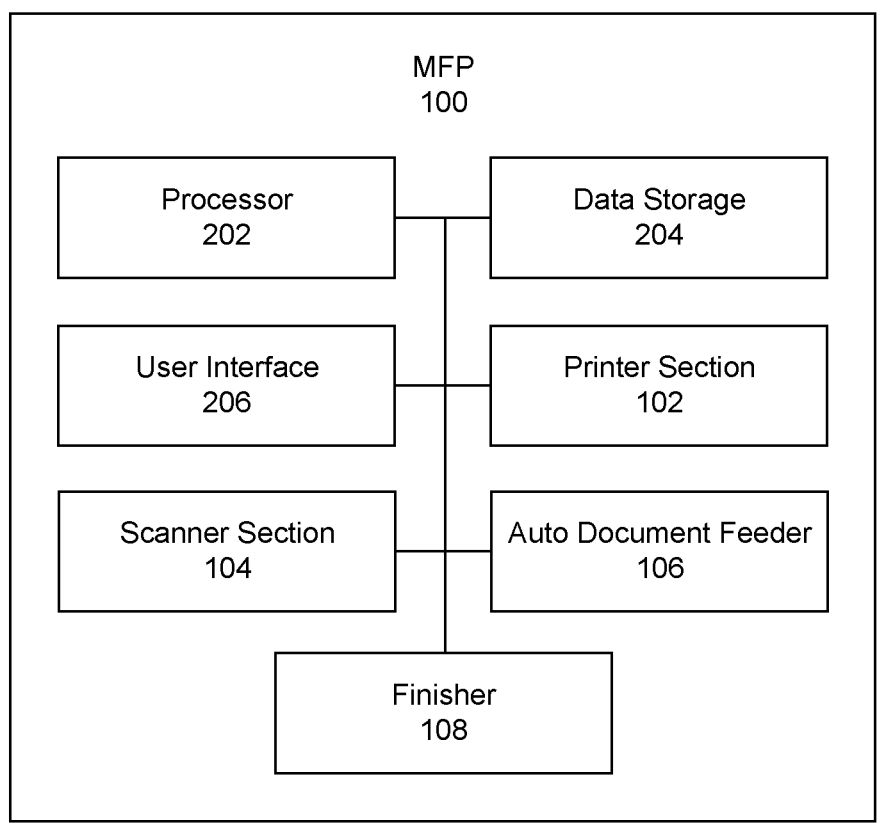
FIG. 2 depicts an embodiment of an MFP's internal components.

As shown in FIG. 2, an MFP 100 can further comprise a processor 202, data storage 204, and a user interface 206 that can direct and/or assist in the operations other MFP components such as the printer section 102, scanner section 104, ADF 106, and/or finisher 108.

The processor 202 can be a chip, circuit or controller configured to execute instructions to direct the operations of the MFP 100, such as a central processing unit (CPU), application-specific integrated circuit (ASIC), field-programmable gate array (FPGA), graphics processing unit (GPU), or any other chip, circuit, or controller. In some embodiments a plurality of chips, circuits, and/or controllers can operate together to direct the operations of the MFP 100.

Data storage 204 can be one or more internal and/or external digital storage devices, such as random access memory (RAM), read-only memory (ROM), electrically erasable programmable read-only memory (EEPROM), flash memory, digital tape, a hard disk drive HDD), a solid state drive (SSD), and/or any other type of volatile or non-volatile digital memory. The data storage 204 can store instructions executable by the processor 202 to operate the MFP 100, including an operating system and/or applications.

The user interface 206 can comprise hardware and/or software elements for receiving instructions from users and/or displaying information to users. By way of a non-limiting example, the user interface 206 can comprise controls for inputting instructions to the MFP 100 to begin a print job in a print and scan mode as described herein. By way of another non-limiting example, while the MFP 100 is printing and scanning pages as described herein, the user interface 206 can display messages or other information such as progress meters or page counters that indicate that it is printing pages, scanning pages, and/or sending scanned representations to other devices.

In some embodiments the user interface 206 can comprise graphical user interfaces and/or other interfaces operable by users through input/output devices 128. In other embodiments the MFP 100 can alternately or additionally comprise one or more data communication interfaces through which the MFP 100 can connect to separate client devices to receive instructions and/or output information. By way of non-limiting examples, the MFP 100 can have a network and/or IP connection interfaces or peer-to-peer connection interfaces for directly communicating with client devices, such as interfaces using near-field communication, Bluetooth, or Wi-Fi Direct. In these embodiments, a user can connect a client device, such as a mobile phone, computer, tablet, or any other device, to the MFP 100 to interact with the MFP's user interface 206 via the client device.

In some embodiments the MFP 100 can further comprise fax components for faxing scanned documents, network components for transmitting data over the internet or any other data network, and/or ports for connecting to other devices, such as USB and Ethernet ports. In some embodiments the printer section 102 and the scanner section 104 can work together in a copy function to scan documents on the platen 114 or that pass through the ADF 106 using the scanner section 104 and then print them using the printer section 102.

FIGS. 3A-3D depict cross-sections of an embodiment of an ADF 106. An ADF 106 can comprise a scan input path 302 that branches into a scan output path 304 and an ADF connector path 306. The scan input path 302, the scan output path 304, and the ADF connector path 306 can be pathways through which sheets of paper can move. As such, they can be at least as wide and as deep as a sheet of paper of a predefined size and/or type. By way of a non-limiting example, an MFP 100 configured to scan sheets of 8.5 inch by 11 inch paper can have paper paths at least 8.5 inches wide. In some embodiments the ADF 106 can comprise paper guides 310 in one or more of its paper paths that can be automatically moved using motors, servos, or other mechanisms to adjust the dimensions of passable portions of the paper paths, and/or change the orientation of paper being conveyed through the paper paths. By way of a non-limiting example, the ADF 106 can have one or more paper guides 310 with walls that can move transversely to the direction at which paper passes through the paper paths, such that the paper guides 310 can move to widen or narrow the paper paths to match the width of paper currently passing through the ADF 106. By way of a non-limiting example, the ADF 106 can have one or more paper guides 310 that can move at angles to re-orient paper passing through the paper paths. The ADF 106 can further comprise one or more mechanized rollers 312, pullers, arms, or other conveyance mechanisms that can pull, push, or otherwise move a sheet of paper through the paper paths as will be described below.

The ADF 106 can also comprise an path guide 308 at the point at which the scan input path 302 branches into the scan output path 304 and the ADF connector path 306. The path guide 308 can be a mechanized component that can be moved to selectively close off either one of the scan output path 304 and the ADF connector path 306 from the scan input path 302.

Figure 3A:
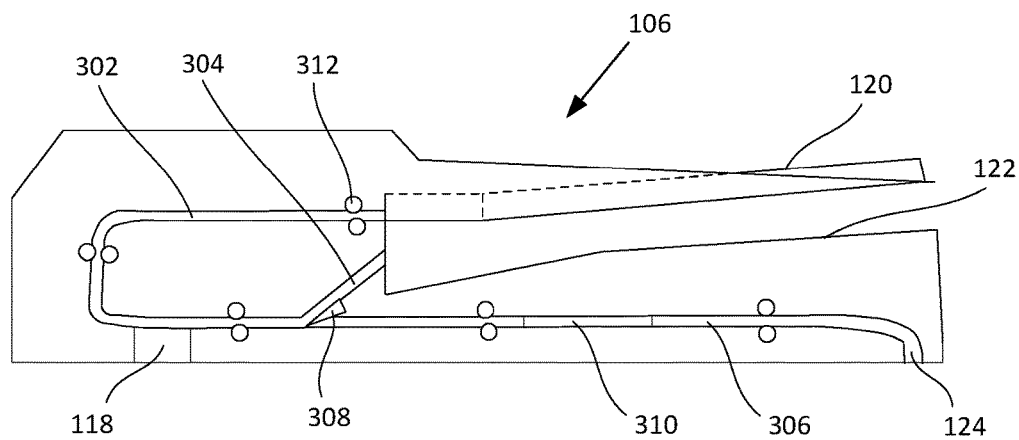
FIG. 3A depicts a cross section of an exemplary embodiment of an auto document feeder (ADF).
Figure 3B:
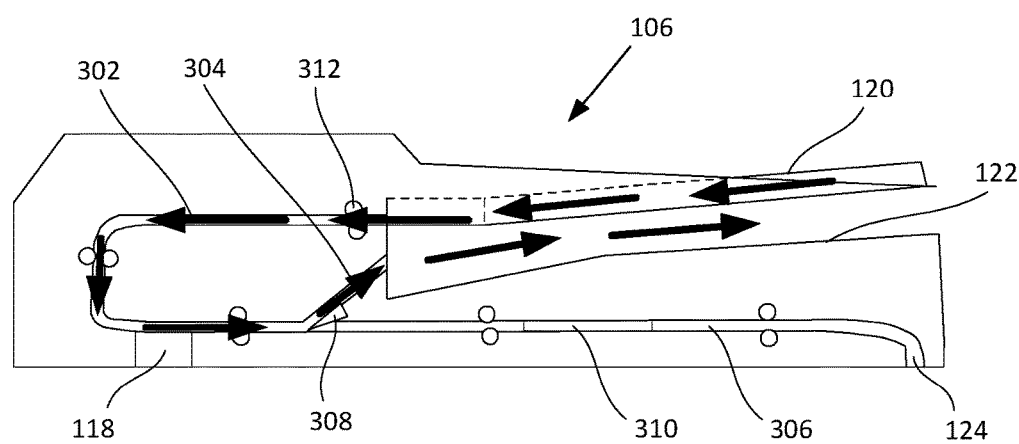
FIG. 3B depicts a route through the ADF of FIG. 3A from a scan input tray to a scan output tray.
Figure 3C:
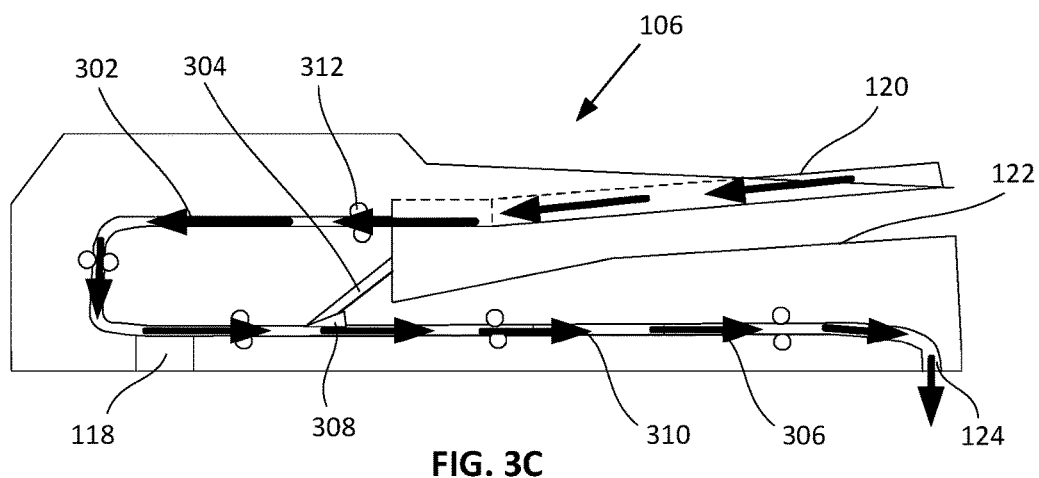
FIG. 3C depicts a route through the ADF of FIG. 3A from a scan input tray to an ADF connector path.

FIGS. 3B and 3C depict examples of the MFP 100 being used to scan paper placed at the scan input tray 120. The ADF 106 can pull paper from the scan input tray 120 into the scan input path 302. As the paper is moved through the scan input path 302, it can pass by a scanner opening 118 and be scanned by image sensors 116 in the scanner section 104 below. The path guide 308 can then either divert the paper into the scan output path 304 such that it exits at the scan output tray 122 as shown in FIG. 3B, or into the ADF connector path 306 such that it passes into the scanner section 104 via the paper path cutouts 124 as shown in FIG. 3C. If scanned paper is diverted into the ADF connector path 306 and into the scanner section 104, in some embodiments it can further be routed into the printer section 102 and/or finisher 108, such that the scanned paper can be printed on and/or finished.

Figure 3D:
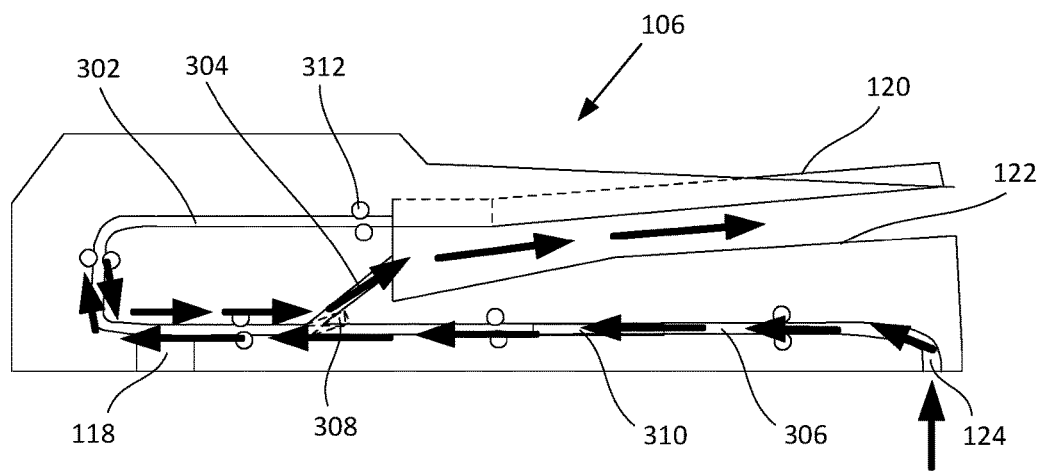
FIG. 3D depicts a route through the ADF of FIG. 3A from an ADF connector path into a scan input path and then to a scan output tray.

FIG. 3D depicts an example of the MFP 100 scanning printed paper. Paper that has been printed by the printer section 102 can be routed through the scanner section 104 and into the ADF 106 via paper path cutouts 124, such that it enters the ADF connector path 306. The path guide 308 can be positioned such that the paper passes from the ADF connector path 306 into the scan input path 302. Rollers 312 or other mechanisms can then reverse the paper's direction in the scan input path 302, and the path guide 308 can move to divert the paper into the scan output path 304 such that it exits at the scan output tray 122. Paper can be scanned through a scanner opening 118 by image sensors 116 in the scanner section 104 below as the paper moves in either direction through the scan input path 302.

In some embodiments the MFP 100 can comprise physical and/or optical sensors that can detect the dimensions of printed paper entering the ADF 106, and/or the orientation of text or images printed on that paper. In other embodiments the printer section 102 can communicate paper dimensions and/or the orientation of printed information on the paper to the ADF 106. When the ADF 106 determines that the printed paper received from the printer section 102 is narrower than its paper paths or is in an incorrect orientation for scanning, in some embodiments the ADF 106 can use paper guides 310 in its paper paths to adjust the width of the paper paths to match that of the printed paper and/or to re-orient the paper for scanning. By way of a non-limiting example, when printed paper is received at the ADF 106 slightly askew the ADF 106 can use paper guides 310 to re-orient the printed paper as it passes through the ADF connector path 306 or scan input path 302, such that lines of printed text are angled to be perpendicular relative to the direction at which the paper moves through the paths, thereby correcting the text's orientation as it passes by the image sensors 116 during scanning.

Figure 4A:
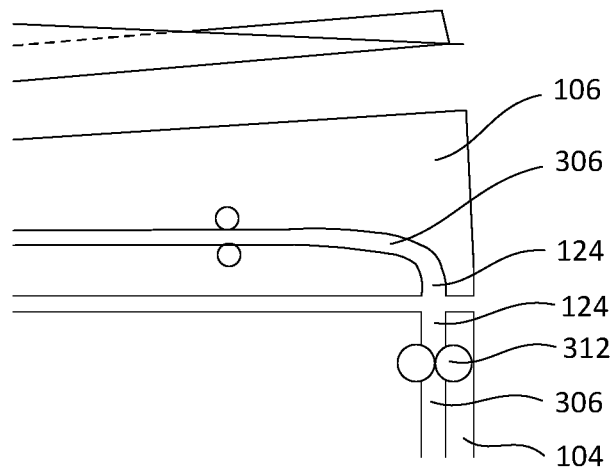
FIG. 4A depicts an ADF connector path with straight paper path cutouts.
Figure 4B:
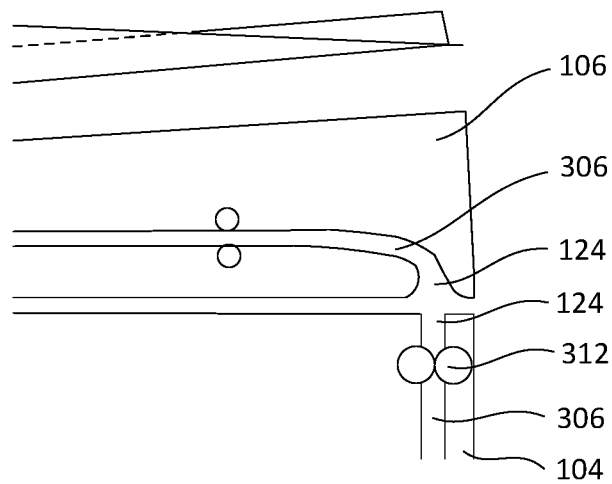
FIG. 4B depicts an ADF connector path with a tapered paper path cutout.

FIGS. 4A and 4B depict close-up views of exemplary embodiments of adjoining paper path cutouts 124 in the ADF 106 and scanner section 104. As described above, a paper can pass between the ADF 106 and scanner sections 104 through aligned paper path cutouts 124 when the MFP's lid is closed. Paper exiting the ADF 106 into the scanner section 104 can enter into a continuation of the ADF connector path 306 that passes through the scanner section 104 and/or printer section 102 as will be described below. Similarly, paper exiting the continuation of the ADF connector path 306 in the scanner section 104 can enter into the ADF connector path 306 at the ADF 106. As with the ADF 106, the scanner section 104 and the printer section 102 can comprise mechanized rollers 312, pullers, arms, or other conveyance mechanisms positioned along its paper paths that can pull, push, or otherwise move a sheet of paper through their paper paths.

In some embodiments the dimensions of the paper path cutout 124 in the scanner section 104 can be substantially similar to the dimensions of the rest of the ADF connector path 306, as shown in FIG. 4A. In alternate embodiments the paper path cutout 124 in the ADF 106 can be curved, tapered, sloped, or otherwise shaped to gradually guide paper exiting the scanner section 104 into the ADF 106, as shown in FIG. 4B. In some embodiments the paper path cutout 124 in the scanner section 104 can be similarly curved, tapered, sloped, or otherwise shaped to gradually guide paper exiting the ADF 106 into the scanner section 104.

Figure 5A:
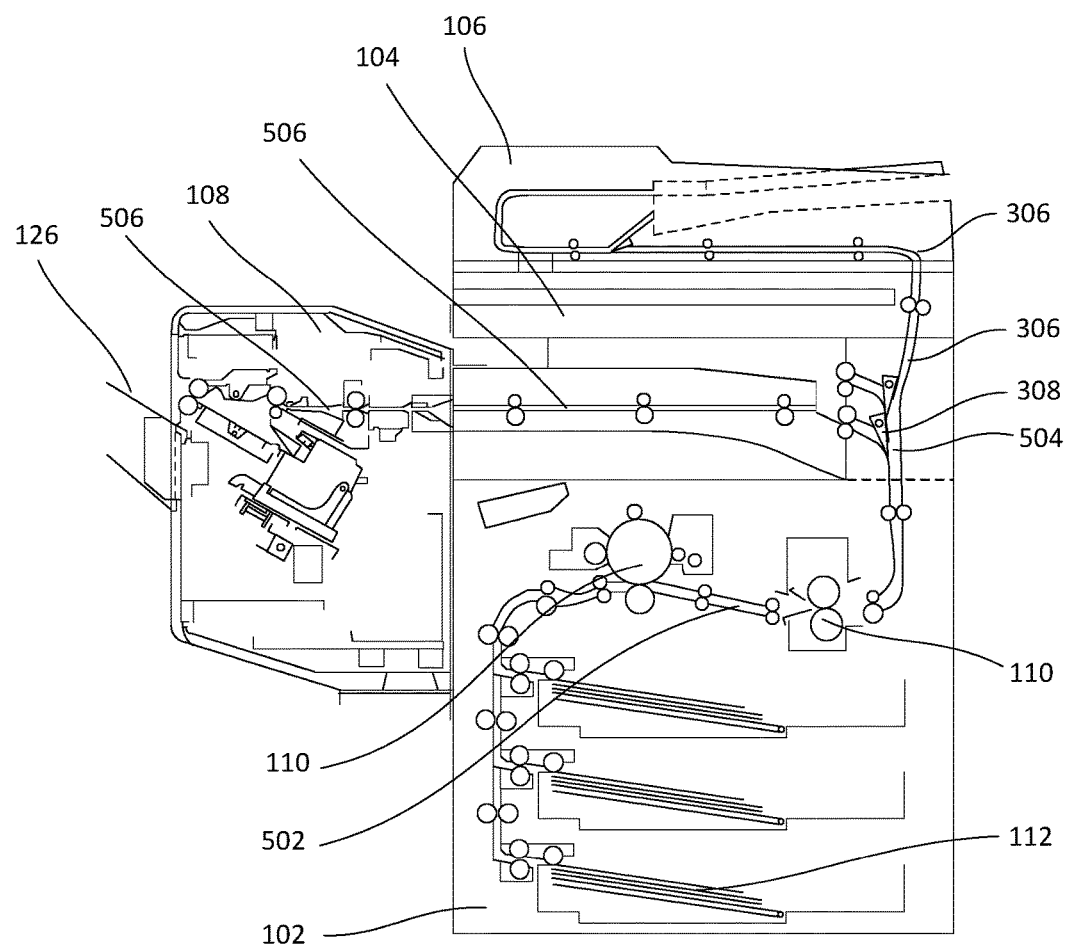
FIG. 5A depicts a cross section of a first exemplary embodiment of an MFP.

FIG. 5A depicts a cross section of a first embodiment of an MFP 100. The MFP's printer section 102 can comprise a print path 502 that conveys sheets of paper from paper storage areas 112 through printer components 110 inside the printer section 102. In some embodiments, a plurality of print paths 502 can join into a main print path 502, such that paper can be drawn from any of a plurality of different paper storage areas 112 into the main print path 502. The printer components 110 can be configured to print text and/or images on the sheets of paper as they are conveyed through the print path 502.

The print path 502 can branch at a post-print junction 504 into a finisher path 506 and the ADF connector path 306. As discussed above, the ADF connector path 306 can continue through the scanner section 104 and into the ADF 106 via aligned paper path cutouts 124. The finisher path 506 can pass through the printer section 102 and/or scanner section 104 into the finisher 108, such that the finisher 108 can perform hole punching, stapling, and/or other finishing operations on paper delivered to the finisher 108. The finisher 108 can output paper received through the finisher path 506 at the print output tray 126. As with the ADF 106, the scanner section 104, the printer section 102, and the finisher 108 can comprise mechanized rollers 312, pullers, arms, or other conveyance mechanisms positioned along their paper paths that can pull, push, or otherwise move a sheet of paper through the paper paths.

The post-print junction 504 at which the print path 502 branches into the finisher path 506 and the ADF connector path 306 can be located at a position following the printer components 110 on the print path 502, such that paper passing through the print path 502 can be printed on by the printer components 110 before the paper reaches the post-print junction 504 and is routed into the finisher path 506 or the ADF connector path 306. The MFP 100 can comprise a path guide 308 at the post-print junction 504 that can be moved to selectively close off either one of the finisher path 506 and the ADF connector path 306 from the print path 502. When a print and scan mode has been selected, the path guide 308 can be moved to divert printed paper from the print path 502 into the ADF connector path 306. When a print and scan mode has not been selected, the path guide 308 can be moved to divert printed paper from the print path 502 into the finisher path 506.

Figure 5B:
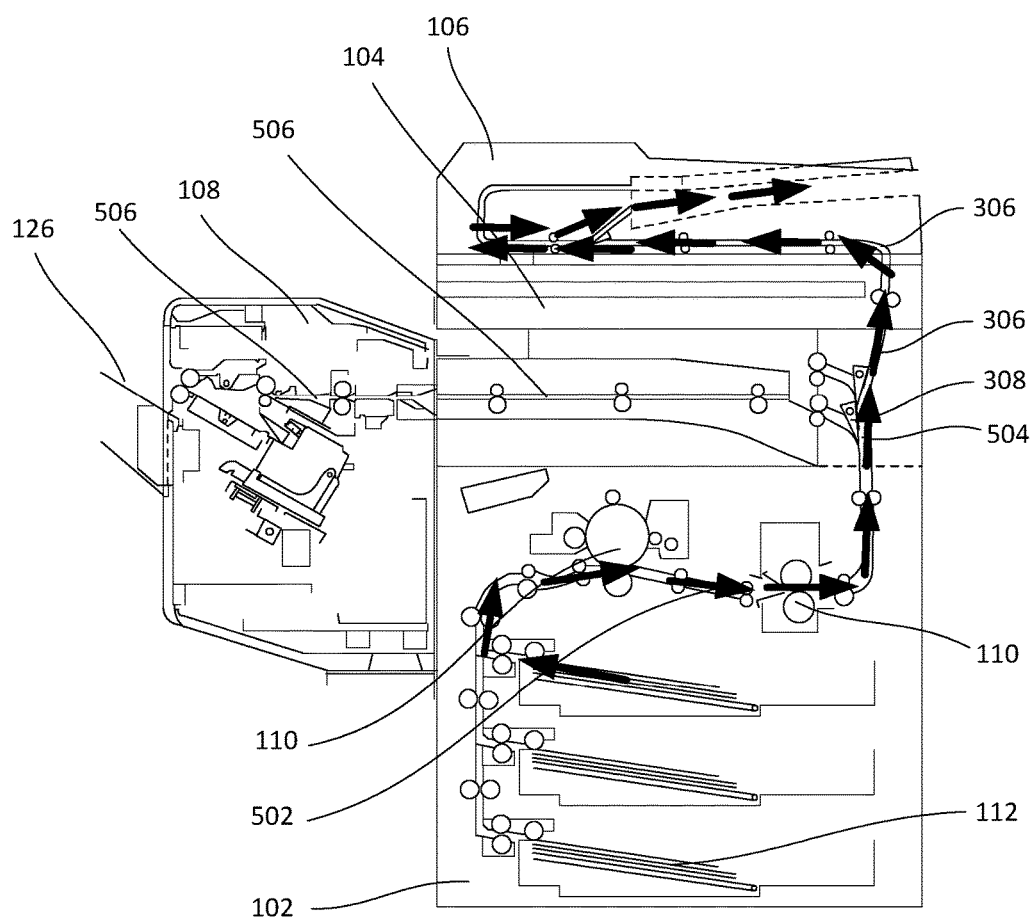
FIG. 5B depicts the embodiment of FIG. 5A in operation in a print and scan mode.

As shown in FIG. 5B, paper originating at a paper storage area 112 can be drawn through the print path 502 such that they can be printed on by printer components 110. If a print and scan mode has not been selected and the paper is to be output at the finisher 108, the path guide 308 at the post-print junction 504 can be moved such that paper in the print path 502 is diverted into the finisher path 506 to the finisher 108. However, if a print and scan mode has been selected and the paper is to be scanned, the path guide 308 at the post-print junction 504 can be moved such that paper in the print path 502 is diverted into the ADF connector path 306 as shown in FIG. 5B. The paper can flow through the ADF connector path 306 into the ADF 106 through aligned paper path cutouts 124. As discussed above with respect to FIG. 3D, paper in the ADF connector path 306 can be drawn into the scan input path 302 so that it can be scanned by image sensors 116 in the scanner section 104 through the platen 114. Rollers 312 or other mechanisms can reverse the paper's movement in the scan input path 302 before or after scanning, and a path guide 308 can divert the paper to the scan output path 304 such that it rests at the scan output tray 122. Accordingly, as shown in FIG. 5B, an MFP 100 can print on paper using its printer components 110 and then selectively divert the printed paper either to the finisher 108 or to the ADF 106 for scanning.

Figure 6A:
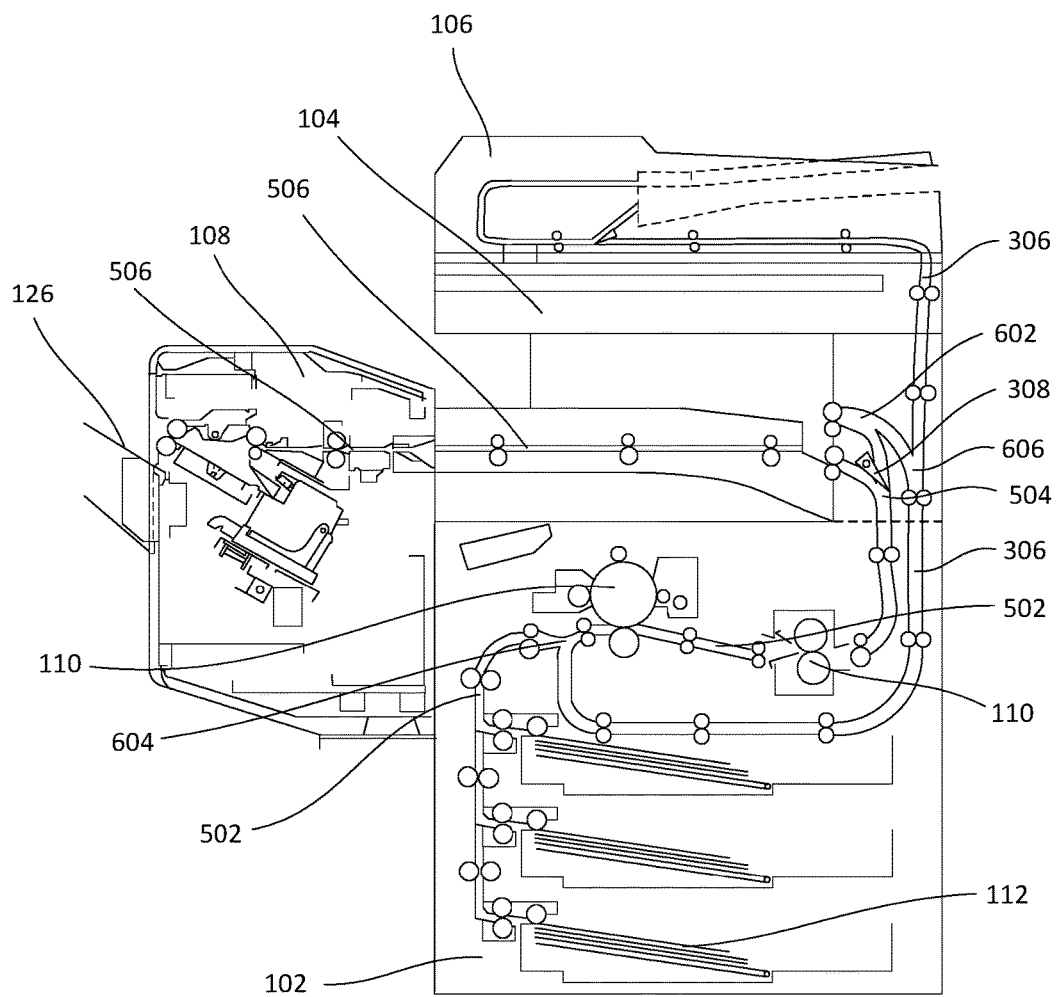
FIG. 6A depicts a cross section of a second exemplary embodiment of an MFP.

FIG. 6A depicts a cross section of a second embodiment of an MFP 100. In this embodiment the MFP 100 can comprise a duplex path 602 that connects the print path 502 and the ADF connector path 306. As discussed below, the duplex path 602 can pass printed paper into the ADF connector path 306 for double-sided printing or for scanning. The duplex path 602 can comprise rollers 312 or other mechanisms that can reverse the movement direction of paper being conveyed through the duplex path 602.

In this embodiment the print path 502 can branch into the finisher path 506 and the duplex path 602 at a post-print junction 504. The ADF connector path 306 can feed into the print path 502 at a pre-print junction 604, and the duplex path 602 can feed into the ADF connector path 306 at a duplex junction 606. The pre-print junction 604 can be located at a convergence point between the print path 502 and the ADF connector path 306 before the printer components 110, at a location such that paper originating from paper storage areas 112 or that has passed through the ADF connector path 306 to the pre-print junction 604 is routed through the printer components 110. The duplex junction 606 can be located at a convergence point between the duplex path 602 and the ADF connector path 306 such that paper passed from the duplex path 602 into the ADF connector path 306 can pass through the ADF connector path 306 in one direction to reach the pre-print junction 604 or be reversed to move through the ADF connector path 306 in the opposite direction to reach the ADF 106.

In this embodiment, after paper has passed along the print path 502 through the printer components 110, a path guide 308 at the post-print junction 504 can be moved to selectively divert the paper into either the finisher path 506 or the duplex path 602. If a print and scan mode has not been selected and paper is to be output at the finisher 108, the path guide 308 at the post-print junction 504 can be moved such that paper in the print path 502 is diverted into the finisher path 506 to the finisher 108. However, if the MFP 100 is set to print on the other face of the paper or is set to scan the paper, the path guide 308 at the post-print junction 504 can be moved to divert the paper into the duplex path 602.

Figure 6B:
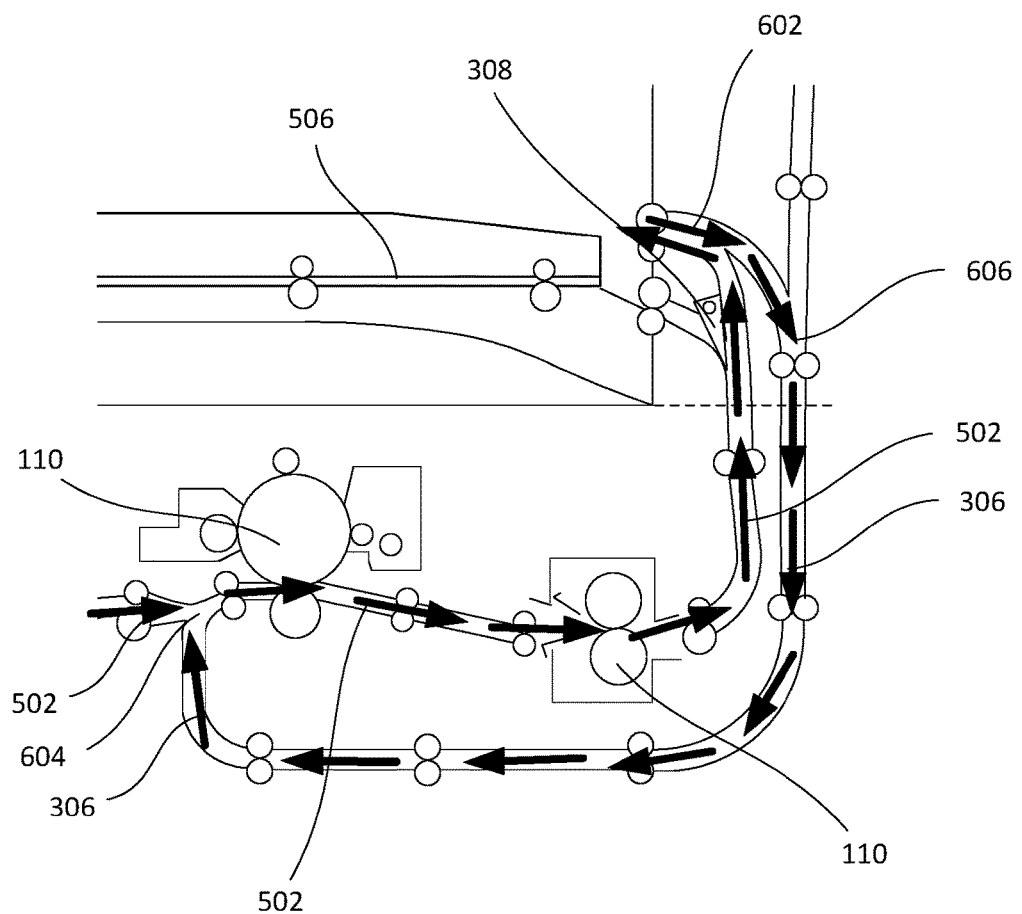
FIG. 6B depicts the embodiment of FIG. 6A in operation in a duplex printing mode.

FIG. 6B depicts a situation in which the MFP 100 has been set to print on both sides of a sheet of paper. After one face of a sheet of paper has been printed on by the printer components 110 during a first pass through the print path 502, the paper can be diverted by the path guide 308 into the duplex path 602. The duplex path 602 can receive the paper and then reverse its movement direction so that it passes into the ADF connector path 306. The MFP 100 can convey the paper along the ADF connector path 306 such that it rejoins the print path 502 at the pre-print junction 604. Reversal of the sheet of paper at the duplex path 602 and passing it into the ADF connector path 306 before rejoining the print path 502 can flip the paper such that its opposing side faces the printer components 110 during its second pass through the print path 502, thereby allowing double-sided printing. After the second pass through the print path 502, the path guide 308 at the post-print junction 504 can divert the sheet of paper into the finisher path 506.

Figure 6C:
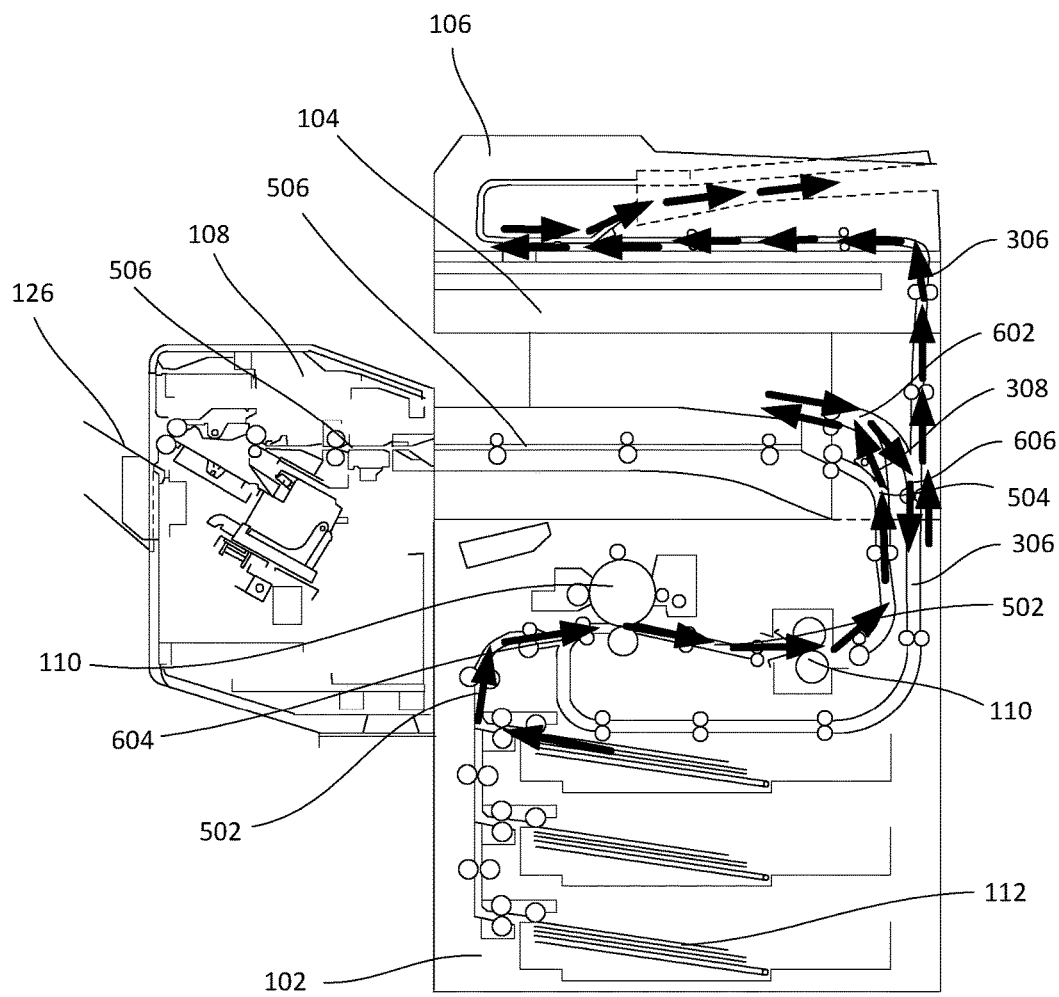
FIG. 6C depicts the embodiment of FIG. 6A in operation in a print and scan mode.

FIG. 6C depicts a situation in which the MFP 100 has been set to scan printed paper in a print and scan mode. After paper has passed through the printer components 110, the paper can be diverted by the path guide 308 into the duplex path 602. The duplex path 602 can receive the paper and then reverse its movement direction so that it passes into the ADF connector path 306. In this situation the ADF connector path 306 can again reverse the paper's movement direction, such that it flows through the ADF connector path 306 into the ADF 106 through aligned paper path cutouts 124. As discussed above with respect to FIG. 3D, paper in the ADF connector path 306 can be drawn into the scan input path 302 so that it can be scanned by image sensors 116 in the scanner section 104 through the platen 114. Rollers 312 or other mechanisms can reverse the paper's movement in the scan input path 302 before or after scanning, and a path guide 308 can divert the paper to the scan output path 304 such that it rests at the scan output tray 122.

When the MFP 100 prints on both sides of a sheet of paper as described above, in some embodiments the MFP 100 can also scan both sides of the printed paper. In some embodiments the MFP 100 can have image sensors 116 both above and below the ADF's scan input path 302 and/or ADF connector path 306 such that pairs of image sensors 116 can scan opposing sides of printed paper as it moves through the ADF 106.

In other embodiments the MFP 100 can scan one side of a sheet of paper, and then use a duplex path 602 in the printer section 102 or scanner section 104 to flip a sheet of paper so that it can be scanned on the other side. By way of a first non-limiting example the MFP 100 can print on a first side of a page with its printer components 110, route the page through the ADF connector path 306 to scan the first side of the page, return the page to the printer section 102 and use a duplex path 602 to flip the page so that it can use its printer components 110 to print on a second side of the page, and then return the flipped page to the ADF 106 through the ADF connector path 306 to scan the second side of the page. By way of a second non-limiting example the MFP 100 can print on both sides of a page as shown in FIG. 6B, then route the page to the ADF 106 using the ADF connector path 306. After scanning one side of the page at the ADF 106, the MFP 100 can return the page to the printer section 102 or scanner section 104 so that it can be flipped using a duplex path 602. The flipped page can then be returned to the ADF 106 so that the second side can be scanned.

Figure 7A:
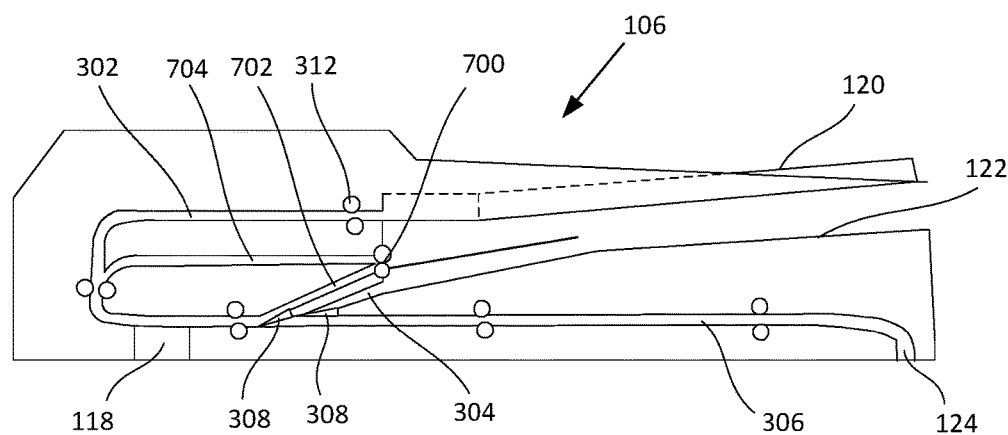
FIG. 7A depicts a first embodiment of an ADF with an ADF duplex path.
Figure 7B:
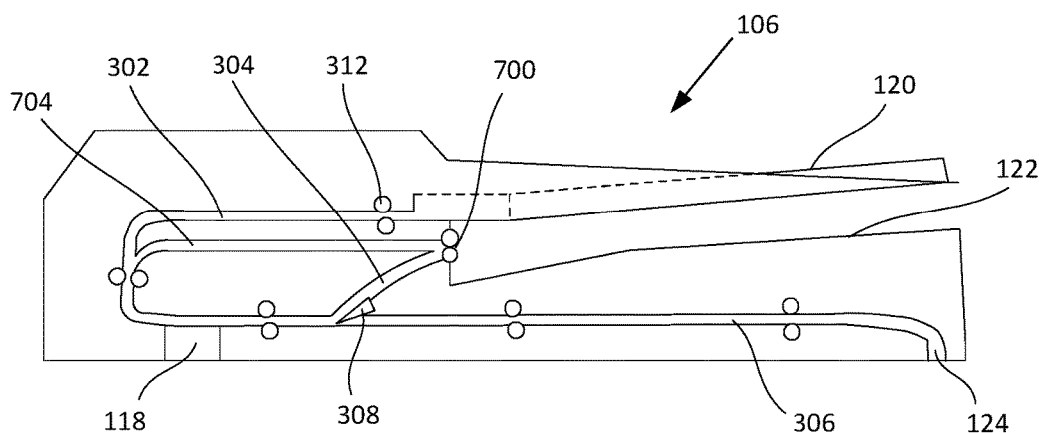
FIG. 7B depicts a second embodiment of an ADF with an ADF duplex path.

In still other embodiments the ADF 106 can have an ADF duplex path 700, as shown in FIGS. 7A-7B. In these embodiments the ADF duplex path 700 can have a first section 702 that flows from the scan input path 302 and a second section 704 that returns to the scan input path 302. As such, paper exiting the first section 702 can be drawn back into the second section 704 such that it re-enters the scan input path 302 with a reverse side facing the image sensors 116 below the ADF 106. As with the scan output path 304, a path guide 308 can open or close the first section 702 of the ADF duplex path 700 to the scan input path 302. In some embodiments the ADF 106 can have a dedicated paper path for the first section 702 of the ADF duplex path 700 as shown in FIG. 7A. In other embodiments the scan output path 304 can serve as the first section 702 of the ADF duplex path 700 as shown in FIG. 7B, such that paper exiting the scan output path 304 can be drawn back into the second section 704 of the ADF duplex path 700 when double sided scanning is desired. When the ADF 106 receives a page printed on both sides from the printer section 102, it can scan the page on a first side during a first pass through the scan input path 302, and then use the ADF duplex path 700 to flip the page for a second pass through the scan input path 302 during which the second side can be scanned.

Figure 8:
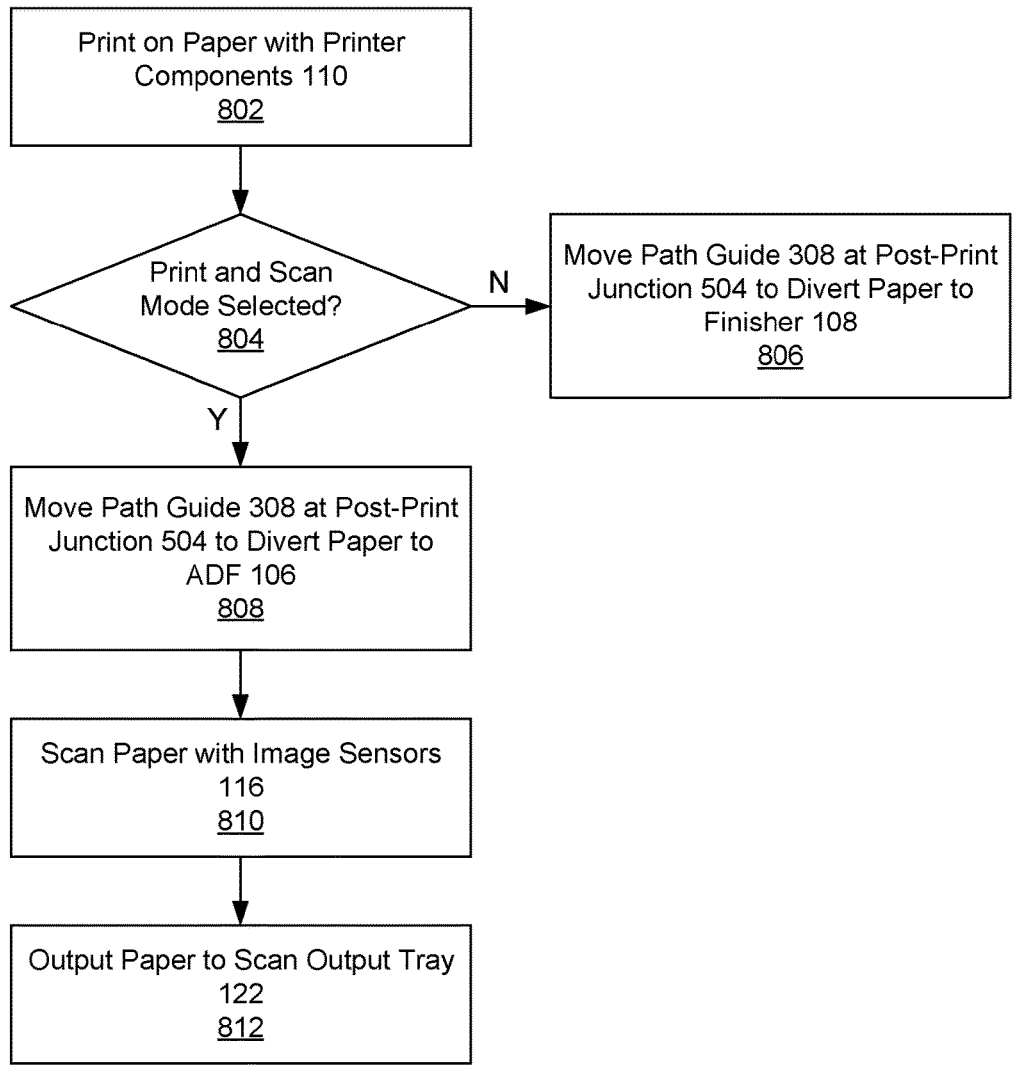
FIG. 8 depicts a flowchart of an exemplary process for directing an MPF to route printed paper either to a finisher output tray or to an ADF for scanning.

FIG. 8 depicts a flowchart of an exemplary process for directing an MFP 100 to print on paper and then route the paper either to the print output tray 126 or to the ADF 106 for scanning.

At step 802, the MFP 100 can print on paper with the printer components 110. By way of a non-limiting example, the MFP 100 can receive a print job from a computer or other device and then convey paper from a paper storage area 112 through the print path 502 so that the printer components 110 can print on the paper according to the print job.

At step 804, the MFP 100 can determine whether a print and scan mode has been selected. In some embodiments a user can select a print and scan mode when the user initiates a print job, either directly at the MFP 100 through its user interface 206 or through a settings menu on a computer or other device when the user initiates the print job.

If the MFP 100 determines at step 804 that it a print and scan mode has not been selected, it can move to step 806 and move a path guide 308 at the post-print junction 504 such that the printed paper is diverted into the finisher path 506. The printed paper can thus be conveyed through the finisher path 506 where any selected finishing operations can be performed, such as stapling or hole punching. The printed paper can then be output at the print output tray 126. In alternate embodiments, if a print and scan mode has not been selected, a path guide 308 at the post-print junction 504 can be moved to a position such that printed paper is conveyed directly to a print output tray without passing through a finisher 108.

However, if the MFP 100 determines at step 804 that a print and scan mode has been selected, it can move to step 808 and move a path guide 308 at the post-print junction 504 such that the printed paper is diverted into an ADF connector path 306 and is conveyed into the ADF 106 for scanning. In some embodiments the path guide 308 can be moved to divert the paper into the ADF connector path 306 that leads to the ADF 106, as discussed above with respect to FIGS. 5A-5B. In other embodiment the path guide 308 can be moved to divert the paper into a duplex path 602 that conveys the paper into an ADF connector path 306, as discussed above with respect to FIG. 6A and FIG. 6C.

At step 810, the MFP 100 can scan the printed paper. As described above with respect to FIG. 3D, the ADF 106 can move the printed paper from the ADF connector path 306 into the scan input path 302 where it can be scanned by the scanner section's image sensors 116 through a scanner opening 118. Scanning the printed paper can occur as the paper is conveyed through the scan input path 302 in either direction.

At step 812, the MFP 100 can output the printed and scanned paper at the scan output tray 122. As described above with respect to FIG. 3D, the MFP 100 can move a path guide 308 such that, after the paper's movement direction in the scan input path 302 has been reversed, the paper is directed into the scan output path 304 and out to the scan output tray 122. By way of a non-limiting example, once the paper has cleared the ADF connector path 306 and has entered the scan input path 302, the path guide 308 can be moved from a position closes off the ADF connector path 306 and instead opens the scan output path 304.

The scanned representations of printed paper can be stored in local memory at the MFP 100, be sent to one or more auxiliary destinations, or be stored or processed in any other desired manner. Auxiliary destinations can be removable memory, cloud storage, memory on another device, an email address, a fax number, a network folder, an FTP folder, or any other file storage location or device configured to accept scanned representations of printed paper. In some embodiments one or more post-scanning actions can be selected by a user through the MFP's user interface or through a settings menu when a print and scan operation is initiated on a computer or other device.

Figures 9, 10:
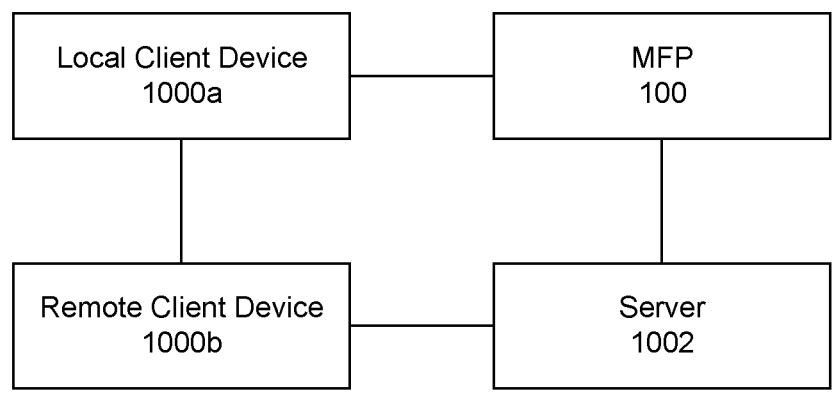
FIG. 9 depicts an exemplary menu for selecting options for where to send scanned representations of printed paper following a print and scan mode operation.
FIG. 10 depicts an exemplary operating environment comprising a local client device, an MFP, a server, and a remote client device.

By way of a non-limiting example, FIG. 9 depicts an exemplary menu for selecting options for where to send scanned representations of printed paper following a print and scan mode operation. In the embodiment of FIG. 9, users can select "On" or "Off" at a "Print then Send" section to indicate whether or not they want the MFP 100 to scan printed pages and send the scanned representations to one or more auxiliary destinations. Auxiliary destinations can be selected in the options menu of FIG. 9 by selecting one or more rules and inputting corresponding auxiliary destination information, such as instructing the MFP 100 to send scanned representations via email to specified email addresses, to specified shared folders on a network via the Server Message Block (SMB) protocol, to specified folders via an FTP (File Transfer Protocol) connection, and/or to specified fax numbers.

FIG. 10 depicts an exemplary operating environment in which a local client device 1000*a* can initiate a print and scan job at an MFP 100 such that the MFP 100 uploads scanned representations of printed pages to a server 1002 where they are available to remote client devices 1000*b*. The client devices 1000 can be computers, tablet computers, mobile phones, or any other types of computing device. The local client device 1000*a* can be in direct or indirect communication with the MFP 100 such that it can initiate a print job at the MFP 100. The remote client device 1000*b* can be configured to connect to the server 1002 over an internet connection. The server 1002 can comprise digital memory where it can store data uploaded from the MFP 100, and can make the uploaded data available for downloading to remote client devices 1000*b*. In some embodiments the server 1002 can host a website through which a remote client device 1000*b* can view and download available scanned representations of printed pages. In other embodiments the server 1002 can make scanned representations of printed pages available to remote client devices 1000*b* over other types of connections, such as FTP connections. The server 1002 can be a local or remote server operated by the same entity as the local client device 1000*a* and/or MFP 100, a cloud server operated by another entity, or any other type of server 1002.

By way of a non-limiting example, the local client device 1000*a* can be a desktop computer that can connect to the MFP 100 over an office intranet, while the remote client device 1000*b* can be a laptop computer at an employee's home. In this example, an employee in an office can operate a local client device 1000*a* to initiate a print job at the MFP 100 in the office, and the MFP 100 can print and then scan pages as described above. The MFP 100 can upload scanned representations of the printed pages to the server 1002, and an employee at home can use a remote client device 1000*b* to access the scanned representations at the server 1002.

Figure 11:
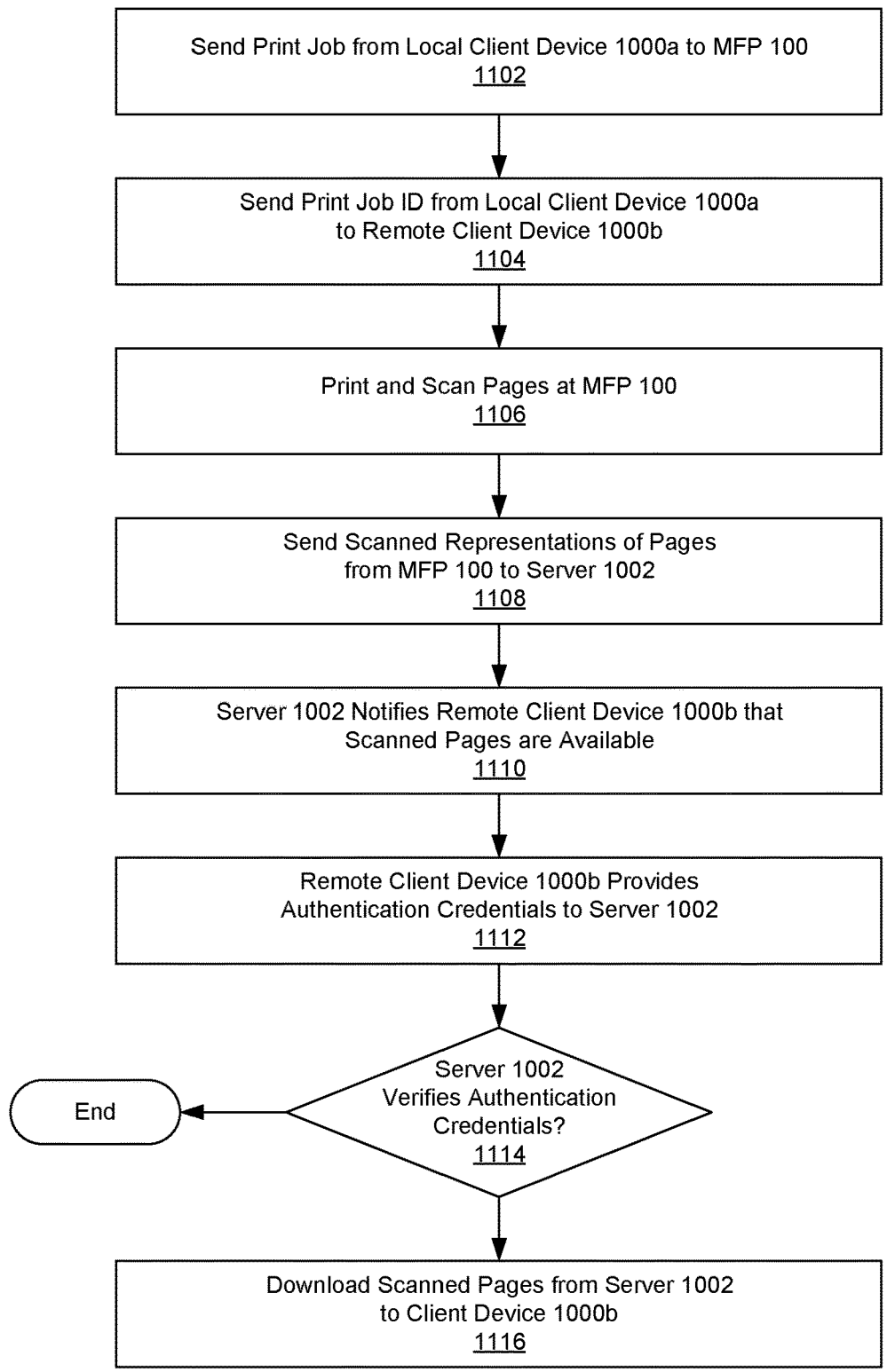
FIG. 11 depicts a flowchart of an exemplary process for uploading scanned representations of printed pages to a server.

FIG. 11 depicts a flowchart of an exemplary process for uploading scanned representations of printed pages to a server 1002, using the operating environment shown in FIG. 10.

At step 1102, the local client device 1000*a* can send a print job to the MFP 100. The local client device 1000*a* can run a print driver or other application that can prepare and/or pass a print job to the MFP 100 to print a document stored in memory at the local client device 1000*a*. In some embodiments a print job can be represented using a page description language (PDL), such as PostScript, PCL (Printer Command Language), PDF (Portable Document Format), or XPS (XML Paper Specification). PDL code can include commands that describe the content, format, and/or layout of each individual element on a page, such as individual images and pieces of text. By way of a non-limiting example, when user instructs a computer to print a document, a printer driver can be invoked that converts the computer's representation of that document or image into PDL code that can be sent to the MFP 100 as a print job.

The local client device 1000*a* can indicate in the print job or in a separate instruction to the MFP 100 that pages should be printed and then scanned as discussed above, and that the scanned representations of the printed pages should be uploaded to the server 1002. The local client device 1000*a* can indicate in the print job or in a separate instruction the identity of the remote client device 1000*b* or a user of the remote client device 1000*b*. By way of a non-limiting example, the local client device 1000*a* can include an email address or username of a user that is expected to use a remote client device 1000*b* to access scanned representations of pages printed according to the print job via the server 1002. In some embodiments the MFP 100 can return a unique print job identifier to the local client device 1000*a* in response to receipt of a print job. In other embodiments the local client device 1000*a* can define a print job identifier for the print job and include it with other information about the print job submitted to the MFP 100.

At step 1104, the local client device 1000*a* can send the print job identifier to the remote client device 1000*b*, or to a user of the remote client device 1000*b*. By way of a non-limiting example, the local client device 1000*a* can include the print job identifier in an email, instant message, or any other type of notification sent to the remote client device 1000*b* over the internet or other network.

At step 1106, the MFP 100 can print and scan pages according to the print job. By way of a non-limiting example, when the print job includes PDL commands, the MFP 100 can interpret the PDL commands and use its printer components 110 to print text and/or images on paper passing through the print path 502. The MFP 100 can position a path guide at the post-print junction 504 to route the printed paper through the ADF connector path 306 and into the ADF 106, where it can scan the printed paper before outputting it at the scan output tray 122.

At step 1108, the MFP 100 can send scanned representations of one or more printed pages to the server 1002. The MFP 100 can also notify the server 1002 of the print job identifier associated with the print job and/or the identifier of the remote client device 1000*b* or a user of the remote client device 1000*b*. The server 1002 can store uploaded scanned representations in memory, such that they can be retrieved by other devices through a web site, FTP connection, or other interface.

At step 1110, the server 1002 can notify the remote client device 1000*b*, or a user of the remote client device 1000*b*, that scanned representations have been uploaded that are associated with the print job identifier. By way of a non-limiting example, when the local client device 1000*a* provided an email address of a user of the remote client device 1000*b* to the MFP 100, and the MFP in turn provided that email address to the server 1002, the server 1002 can send an email to that email address when pages have been uploaded for the corresponding print job identifier.

At step 1112, the remote client device 1000*b* can provide authentication credentials to the server 1002 in an attempt to log into the server 1002 and access the uploaded scanned representations. Authentication credentials can include a username and password, digital certificates, and/or other types of credentials. In some embodiments the remote client device 1000*b* can also provide the print job identifier it received from the local client device 1000*a* during step 1104, to indicate to the server 1002 which scanned representations it is attempting to access.

At step 1114, the server 1002 can attempt to verify the authentication credentials provided by the remote client device 1000*b*. By way of a non-limiting example, the server 1002 can compare a provided username and password combination against a user account database to determine if a valid match is found in the database. If the server 1002 determines that the authentication credentials are not valid, or that they are not associated with permissions that allow the remote client device 1000*b* to access the scanned representations associated with the print job identifier, the server 1002 can deny the connection and the process can end. However, if the server 1002 determines that the authentication credentials are not valid, the server 1002 can grant the remote client device 1000*b* access to the scanned representations associated with the print job identifier.

At step 1116, the remote client device 1000*b* can access the scanned representations associated with the print job identifier. In some embodiments the remote client device 1000*b* can view the scanned representations through a web site interface hosted by the server 1002. In other embodiments the remote client device 1000*b* can download copies of the scanned representations to its local memory.

In some embodiments the server 1002 can wait to notify the remote client device 1000*b* at step 1110 that it has received uploaded scanned representations associated with a print job identifier until the MFP 100 has printed and scanned all pages associated with the print job and has uploaded all of the scanned representations to the server 1002. By way of a non-limiting example, the server 1002 can wait until it receives an upload complete confirmation message from the MFP 100 that signals that all scanned representations associated with the print job identifier have been uploaded to the server 1002.

In other embodiments the server 1002 can begin step 1110 and notify the remote client device 1000*b* as soon as it has received at least one scanned representation associated with a print job identifier. In these embodiments the remote client device 1000*b* can log in to the server 1002 using authentication credentials to access those scanned representations that have already been received by the server 1002, while the MFP 100 can continue uploading additional scanned representations associated with the print job identifier to the server 1002. By way of a non-limiting example, when a print job instructs the MFP 100 to print and scan thirty pages, the server 1002 can notify the remote client device 1000*b* at step 1110 that scanned representations are available as soon as the first one has been received by the server 1002. The remote client device 1000*b* can log in and begin viewing the scanned representation of the first page even if the server 1002 has not yet received scanned representations of all thirty pages. The server 1002 can continue receiving scanned representations until the MFP 100 notifies the server 1002 that scanned representations of all pages have been uploaded, at which point the server 1002 can notify the remote client device 1000*b* that all scanned representations have been uploaded and are accessible at the server 1002.

As described above, a user can use the MFP 100 to print one or more pages of a document and also scan the printed pages without manually moving the pages from an output tray to the ADF 106 or scanner section 104.

In some situations a user can use the MFP's print and scan functionality to automatically send a digital copy of scanned pages to themselves and/or other users when they print documents with the MFP 100. By way of a non-limiting example, a user can print a document at the MFP 100 in order to generate a hard copy, but select a print and scan mode such that a scanned representation of the hard copy is automatically emailed to a supervisor or is uploaded to a shared network folder where colleagues can access it.

In other situations the MFP's print and scan functionality can be used to check the print quality of prints generated by the MFP 100. Scanned representations can be reviewed digitally to check the physical print quality, such as checking for areas with banding, missing colors, incorrect colors, faded colors, smearing, incorrect characters, double-printed objects, or any other problem.

In some cases quality assurance engineers can manually review scanned representations digitally for print quality problems. Reviewing scanned representations can be faster and/or more efficient than physically flipping through printed pages. Additionally, the engineers reviewing scanned representations can be physically remote from the MFP 100 that printed and scanned the documents.

In other cases scanned representations of a printed document can be automatically compared against the original digital document using image processing software or other applications. By way of a non-limiting example, a comparison of an original digital document against a scanned representation of the printed version of that document can reveal that areas that should have been printed with a dark color appear white in the scanned representation of the printed page, indicating that the MFP 100 may be out of toner or may be experiencing other problems with its printer components 110. In some embodiments an automated quality check script can be activated to compare the original document against a scanned representation, such as at the MFP 100 following scanning, or at a client device 1000 or server 1002 that has access to the original document and the scanned representation.

In some cases a quality assurance engineer can set an MFP 100 to print and scan documents and digitally store the scanned representations in a particular folder. The engineer can run a quality check automation script to open the folder and compare the scanned representations against the original digital document. The script can indicate to the engineer via a notification, email, or any other method whether or not any print quality issues were found with the scanned representations. As such, if the script identified print quality issues the engineer can load the scanned representations to manually review them for print quality issues. However, if the script did not identify any print quality issues, the engineer can skip manually reviewing those scanned representations and thereby save time by not reviewing scanned representations unlikely to be problematic.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. A method of printing and scanning paper and transmitting scanned representations to a server, comprising:

receiving a print job and a destination identifier at a multifunctional printer from a local client device, the destination identifier being associated with a remote client device;

printing according to the print job by conveying paper from a paper storage area at the multifunctional printer through a print path and printing information on the paper with printer components;

routing paper from the print path into an auto document feeder connector path that conveys the paper to an auto document feeder;

scanning the paper with one or more image sensors as the paper is conveyed through the auto document feeder to generate a scanned representation; and uploading the scanned representation from the multifunctional printer to a server over a network connection along with the destination identifier, such that the server makes the scanned representation available to the remote client device associated with the destination identifier.

2. The method of claim 1, further comprising associating the print job with a print job identifier at the multifunctional printer and providing the print job identifier to the local client device, such that the local client device can provide the print job identifier to the remote client device.

3. The method of claim 2, further comprising waiting to upload the scanned representation to the server when the print job comprises multiple pages, until scanned representations for each of the multiple pages have been generated.

4. The method of claim 2, further comprising immediately uploading the scanned representation to the server when the print job comprises multiple pages and continuing to print and scan additional pages and uploading their scanned representations to the server until scanned representations for each of the multiple pages have been generated and uploaded.

* * * * *